March 25, 1952

C. B. STADUM ET AL

2,590,582

WELDING CONTROL

Filed June 21, 1949

INVENTORS
Clarence B. Stadum &
William E. Large.
BY
Hymen Diamond
ATTORNEY

Fig. IB.

March 25, 1952  C. B. STADUM ET AL  2,590,582
WELDING CONTROL

Filed June 21, 1949  3 Sheets-Sheet 3

Used for Aluminum, Stainless Steel, Brass, etc.

Fig. 4.

Used for Steels

Fig. 5.

Used for Reducing Quenching Rates

Fig. 6.

Used for Preheating, Reducing Quenching Rate and Reduction of Noticable Light Flicker

Fig. 7.

WITNESSES:
Robert C. Baird
James F. Young

INVENTORS
Clarence B. Stadum &
William E. Large.
BY
ATTORNEY

UNITED STATES PATENT OFFICE 2,590,582

WELDING CONTROL

Clarence B. Stadum, Buffalo, and William E. Large, Tonawanda, N. Y., assignors to Westinghouse Electric Corporation, East Pittsburgh, Pa., a corporation of Pennsylvania Application June 21, 1949, Serial No. 100,511

15 Claims. (Cl. 219—4)

The present invention relates generally to systems of electric welding, and more particularly to systems for controlling and scheduling welding current during the course of a weld.

Apparatus comprising the present invention is applicable to a wide field of heat treatment, tempering, quenching and other metallurgical operations, by suitable selection of schedules of welding current in the course of a weld, and thereby enables more effective welding than has heretofore been the case. The welding schedule available in accordance with the present invention involves generally a relatively gradual increase of welding current, followed by a period of constant welding current, the latter being in turn followed by a period of decreasing welding current, the various periods being controllable in respect to duration and in respect to rate of change of current therein.

In welding any metal excessive current density at the start of the weld may result in "spitting" or "flashing," because of welding electrode shape, and/or because of surface conditions at the metal. Slow build up of welding current at the start of a weld results in preheating and preparation of the metal for welding, and has been found, in practice, to alleviate or eliminate "spitting" or "flashing." "Spitting" and "flashing" is sometimes caused by the presence of surface oxides, such as scale on hot rolled steel. The presence of such oxides is undesirable when welding, in general. It has been found that surface oxides, or scale, may be caused to go into solid solution with the metal being welded, in the presence of reduced welding current flow, which is insufficient of itself to produce a weld. Once the oxides or scales have been so dissolved welding current may be applied, and a clean weld will result, without "spitting" or "flashing," or the like. It, accordingly, becomes feasible to weld scaly, oxide coated metals as readily as clean metals, without an intermediate step of cleaning the metal.

It has been found that sudden application of current to a weld, and sudden cessation of that current, resulting in rapid heating and subsequent rapid cooling of the weld, cause a brittle weld, which may prove weak, especially when subjected to sudden strains, or to impact. It is normally preferable to produce a ductile weld, since ductile welds are generally strong, and resistant to impactive forces. By adequate preheating, the metal surrounding the weld may be sufficiently heated to reduce the quenching rate after the weld is made, the total heat available, and hence the time required for its dissipation, being greater than the heat of the weld itself. Slower quenching results in a more ductile weld.

Additionally, or in substitution, allowing a reduced post weld current to flow in the weld maintains the temperature of the weld after completion thereof, resulting in a reduced quenching rate, and a consequent ductile weld.

In addition to the advantages above recited, in respect to quality of weld, further advantages are found to flow from use of scheduled welding currents, involving slow build-up and decay of the welding current. Utilization of a low current at the start of a weld period, and at its termination, with high current during the actual welding, results in less disturbance in the power system which supplies the welder, and better regulation thereof, reducing visible flicker in lamps on the same circuit, as well as undesirable effects on other welding machines connected to the same source of power. While the total voltage drop introduced in response to flow of a given welding current is independent of its scheduling, if the rate at which the welding current changes is low, the eye will not detect the resultant variations of illumination supplied by lamps connected to the welding circuit, and the voltage regulators and voltage variation compensating circuits supplied with a group of welders energized from the same power line will have sufficient time to function.

A further effect which is important in welding oxide coated or scaly metal is welding pressure, and particularly welding pressure during the preheat period of scheduled welding current. Equipment comprising the present invention may, accordingly, be provided with forge timing circuits which operate in conjunction with the scheduling circuits to provide optimum pressures and preheat currents, in the course of a weld schedule.

A serious problem which is encountered in spot welding aluminum and its alloys involves the deposition of aluminum on the welding electrodes. This effect is progressive, additional aluminum being deposited during successive welds, and results shortly in an inoperative, or at least inefficient and sticky electrode, necessitating cleaning, and sometimes machining, of the electrode. It has been found that deposition of aluminum on welding electrodes is materially reduced by a short pre-heat period, or by a scheduled welding current involving a gradual build up to full welding intensity, and that thereby sticking of the electrodes to the work is materially reduced, or eliminated.

It is accordingly a primary object of the present invention to provide an improved system of welding, utilizing scheduled flow of welding current.

It is a further object of the invention to provide improved electronic controls for a spot welder, which schedule the welding current selectively in accordance with a wide variety of time-current schedules.

It is another object of the invention to provide a novel welding current scheduling system which shall be more flexible in adjustment than previously known systems.

It is still another object of the present invention to provide a system of welding aluminum and its alloys which reduces deposition of aluminum, or of its alloys, on the welding electrodes of the system.

It is still another object of the present invention to provide a system of welding which provides a more ductile weld in metal than has heretofore been the case, by controllable scheduling of the welding current.

It is still a further object of the invention to provide a welding system which is capable of welding operations on scaly, oxide coated metal.

It is another object of the invention to provide a system of welding which reduces transient disturbances of the power source for the system.

Still another object of the invention resides in the provision of a welding current scheduling system which provides selectively a wide variety of time variations of current build-up and decay.

Another object of the invention resides in the provision of a welding system having forge pressure control during build-up of welding current, to establish an effective weld between metals coated with scales or oxide.

The above and still further objects and advantages of the present invention will become apparent upon consideration of the following detailed description of specific embodiments of the invention, especially when taken in conjunction with the appended drawings, wherein:

Briefly described the present invention provides scheduling of current in each spot of a weld by controlling the firing times of ignitrons connected in back-to-back relation in series with the primary winding of a welding transformer. The ignitrons are fired by firing thyratrons, the firing times of which are controlled in turn by control thyratrons, to the anodes and control electrodes of which are applied alternating currents in mutually displaced phase. The firing times of the control thyratrons is accordingly determined by the relation between the phases of the voltages applied to the anodes thereof, as compared with the phases of the voltages applied to the control electrodes thereof, taken together with the value of a D. C. bias applied to the control electrodes.

In accordance with one aspect of the present invention, the D. C. bias is made variable, decreasing in accordance with a predetermined time law from the time of initiation of each spot weld. The variable D. C. bias is generated in the anode circuit of a triode, which has a variable bias established in response to discharge of a condenser through a shunting resistance. Various time laws of bias variation may be acomplished by varying the discharge resistance, or by varying the initial bias on the triode, or by varying the total voltage taken form the anode circuit of the triode, or by some combination of these.

In accordance with the invention, there are further provided circuits for scheduling the decay or decrease of welding current at the end of a spot weld. To this end, a first timing circuit is provided which initiates a timing cycle when welding current starts, and which, at a predetermined time thereafter initiates discharge of a condenser which serves to determine the bias of a control triode. Scheduling of current decrease at the termination of a weld may, accordingly, be accomplished by predetermination of the discharge resistance, or the initial bias of the triode, or by the setting of a potentiometer, connected in the anode circuit of the triode, and from which a bias for the firing control thyratrons is taken.

A modification of the present invention is provided, in which rise of welding current is initiated in response to initiation of welding current. In accordance with this embodiment of the invention, the bias source for the firing control thyratrons comprises a condenser in shunt with a discharging resistance of variable magnitude. The condenser is normally maintained charged by a source of alternating voltage, the voltage being applied to the condenser through a thyratron which is normally biased to firing condition, so that the condenser acquires an increment of charge during each cycle of the alternating voltage. An off-bias control circuit for the thyratron is provided, which develops cut-off bias in response to flow of current in the welding transformer. To this end, an A. C. voltage induced by the welding current is rectified, and applied to charge a condenser which is connected between the control electrode and cathode of the thyratron. Accordingly, when welding current initiates the thyratron cuts off, and the bias condenser connected in the control electrode to cathode circuit of the firing control thyratrons commences to discharge. The condenser discharge per se then provides the required variation of bias.

The modified circuit is not capable of as varied adjustment as is the first described circuit, providing only for a variation in rate of decrease of bias. However, the modified circuit has the advantage of greater simplicity.

Figure 1A:
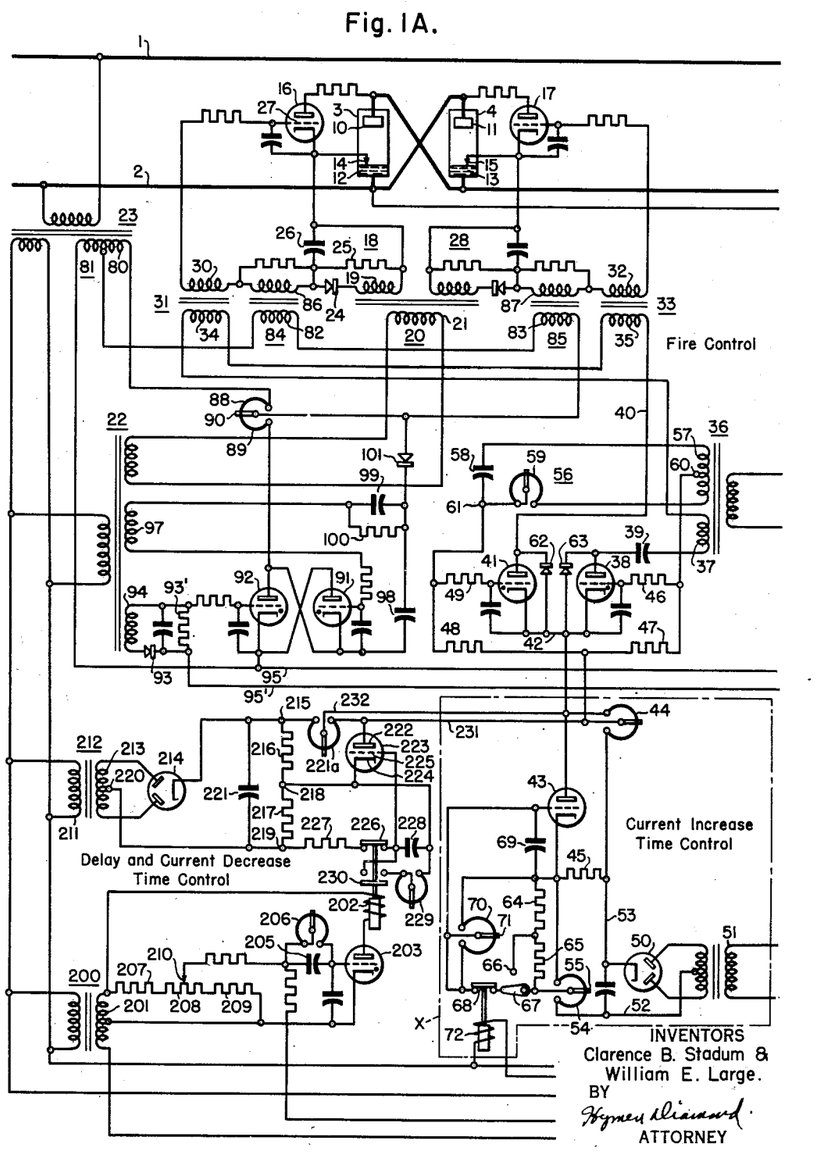
Figures 1A and 1B taken together are a schematic circuit diagram of a welding system arranged in accordance with the invention.
Figure 1B:
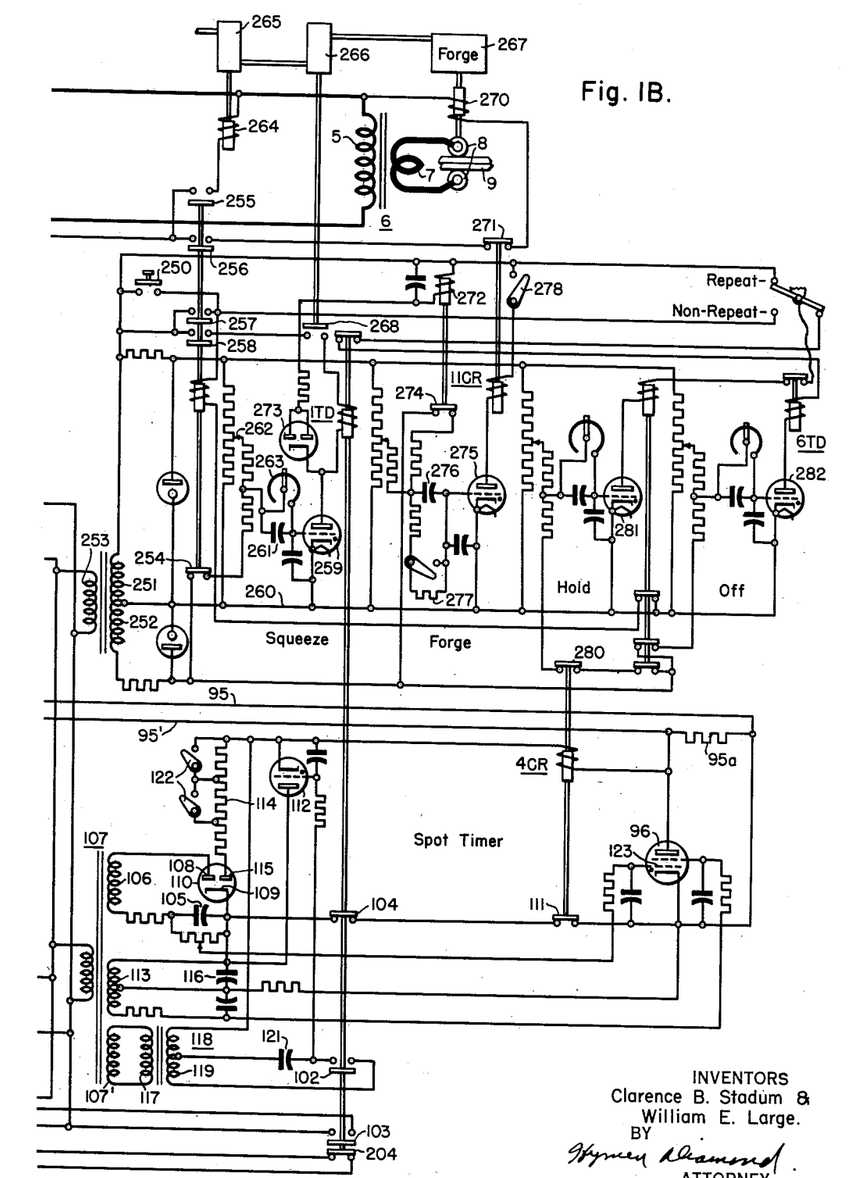

Referring now more specifically to Figures 1A and 1B of the drawings, the reference numerals 1, 2, denote the lines of a power supply system, the line 1 containing in series therewith a pair of back-to-back or inverse parallel connected ignitrons 3 and 4, which control current flow via the lines 1, 2 to the primary winding 5 of a welding transformer 6. The welding transformer 6 is provided with a secondary winding 7 to the ends of which are connected welding electrodes 8, for welding two metallic objects 9 by passing a heavy current therethrough.

The ignitrons 3 and 4 are provided with cross connected anodes 10, 11 and cathodes 12, 13, in accordance with conventional practice, and are further respectively provided with the usual igniter electrodes 14, 15.

Connected between the anode 10 and the igniter electrode 14 of ignitron 3 is a firing thyratron 16, having the usual protective resistor in its anode circuit. A similar firing thyratron 17 is similarly connected between the anode 11 and the electrode 15 of ignitron 4.

Each ignitron is fired in response to current fed into its igniter electrode by the associated firing tube. The ignitrons are normally blocked even during periods of positive anode potential applied thereto, until such time as an associated firing tube is fired. When a firing tube passes current to an igniter electrode the ignitron containing the electrode fires, and passes current until its anode potential becomes substantially zero, or goes negative. Current flows through the firing thyratrons themselves for only a small fraction of each cycle, as is well known in the art, since, as soon as an ignitron associated with a firing thyratron fires, the voltage drop thereacross falls to a value smaller than is required to maintain ionization of the gases internally of the firing thyratron.

The firing thyratrons 16, 17 accordingly each operates, when rendered conductive during the positive half cycle of anode voltage applied thereto, to pass a pulse of current to its associated igniter electrode, 14, 15, which in turn initiates firing of one of ignitrons 3, 4, firing of each of the latter continuing for the remainder of the half cycle of positive anode voltage applied thereto. Since, the ignitrons and the firing thyratrons are connected in inverse parallel with respect to power lines 1, 2, positive potential is applied to the anodes thereof in alternation, and the ignitrons pass current in alternation during successive half cycles of line voltage.

Connected between the control electrode and the cathode of firing thyratron 16 is an off-bias circuit 18 comprising the secondary winding 19 of a transformer 20, having a primary winding 21, which is energized from the lines 1, 2 via transformers 22 and 23. Connected in series with the secondary winding 19 is a rectifier 24 and a resistor 25. Across the latter is connected a storage condenser 26. The resistor 25 and the condenser 26 acquire a unidirectional potential due to current flow via the rectifier 24, and maintain this potential so long as the transformer 20 is energized. The positive terminal of the condenser 26 is connected directly to the cathode of thyratron 16, while the negative terminal is connected to a control electrode 27 of thyratron 16, and normally maintains the latter at a predetermined bias. A similar circuit 28 normally maintains the thyratron 17 at a similar predetermined bias.

The firing times of thyratrons 16 and 17 is determined by firing signals applied thereto in series with the bias voltages provided by bias generating circuits 18 and 28, the firing voltages having sufficient magnitude to overcome the biases and to raise the voltages of the control electrodes of the thyratrons 16 and 17 sufficiently, at some point in the alternating current cycle, to enable firing of the thyratrons 16 and 17 while the anodes thereof are positive.

More specifically, the secondary winding 30 of a transformer 31 is connected in series between the bias circuits 18 and the control electrode 27 of the thyratron 16 is similar secondary winding 32 of a transformer 33 is connected in series with the bias circuit 28 and between the control electrode 27 and cathode of the thyratron 17. The primary windings 34 and 35 of the transformers 31 and 33 are connected in series, and the transformers 31 and 33 are arranged to be oppositely phased, that is, to apply positively phased voltage to the control electrodes of thyratrons 16 and 17 in alternation. The primary windings 34 and 35 are energized from a transformer 36, and specifically via a secondary winding 37 of the latter, the transformer 36 being energized via transformer 23 from the lines 1 and 2. The energizing circuits for the primary windings 34 and 35 of transformers 31 and 33 may be traced from the anode of a firing control thyratron 38 via a D. C. blocking condenser 39 through the energizing winding 37, the secondary windings 34, 35 and back via the lead 40 to the anode of a firing control thyratron 41. Accordingly, so long as the thyratrons 38 and 41 remain unfired the circuit for energizing the transformers 31 and 33 remain uncompleted.

*Rise Time Control*

The cathodes of the thyratrons 38 and 41 are tied together and connected to a lead 42, which is in turn connected to the anode of a triode 43. The grids of the thyratrons 38 and 41 are tied to a voltage dividing resistor 44 connected between the anode of triode 43, and a positive potential source. Specifically, the control electrode of thyratron 38 is connected to a variable tap on resistor 44 via resistors 46 and 47, and the control electrode of the thyratron 41 to the same variable tap via resistors 48 and 49.

The triode 43 is supplied with D. C. anode potential deriving from a conventional rectifier 50 which is energized from a transformer 51 coupled via transformer 23 to the lines 1 and 2. The output of the rectifier 50 appears between leads 52 and 53, the former being positive and connected to the anode of the triode 43, the negative lead 52 of the rectifier 50 being returned via a resistor 54 to the cathode of the triode 43. The resistor 54 is tapped adjustably by means of a tap 55 which is in turn connected, over circuits which will be explained hereinafter, to the control electrode of the triode 43, and accordingly, determines the bias thereof and the average value of the D. C. current flowing therethrough. The current flowing through the triode 43 in turn determines the voltage available across the resistor 44, a selected portion of which is then applied between the control electrodes of the firing control thyratrons 38 and 41 and the cathodes thereof, the latter bias being positive and adequate normally to maintain the firing control thyratrons 38 and 41 in fired condition, but with firing taking place late in the cycle, or to cut-off the triode 43 if desired.

A. C. firing voltage is applied to the control electrodes of the firing control thyratrons 38 and 41 via a phase shifting circuit 56, which is energized from the secondary winding 57 of transformer 36, and which comprises a series connected condenser 58 and variable resistor 59. The value of the resistors 59, when taken in relation to the value of the condenser 58, determines the phase of the voltage available between the center tap 60 of scondary winding 57 of transformer 36, and the junction point 61 between resistors 59 and condenser 58. The center tap 60 is returned to the control electrode of the thyratron 38 via the resistor 46, and to the cathode of the thyratron 38 via the resistor 47 and a portion of the variable resistor 44, in series. Similarly, the junction point 61 is returned to the control electrode of the thyratron 41 via the resistor 49, and to the cathode of the thyratron 41 via the resistor 48 and a portion of the variable resistor 44, in series.

Accordingly, there are applied to the control electrodes of the thyratrons 38 and 41 alternating voltages of opposite phase, which are in series with the D. C. voltage provided across the tapped portion of the resistance 44, the relationship between the magnitude of the alternating current voltages applied to the control electrodes of the thyratrons 38 an 41, and D. C. bias supplied across the tapped portion of the resistance 44 determining, then, the firing times of the thyratrons 38 and 41. These thyratrons fire in alternation, during alternate half cycles of the A. C. supply voltage, at times which may be controlled by varying the current flow in the resistance 44 and, in response, the voltage across the tapped portion thereof. Control of firing times of the thyratrons 38 and 41 may then be controlled by varying the variable tap of the resistance 44, as well as by varying the bias on the triode 43, since varying the tapped position determines the proportionate part of the total voltage appearing across the resistance 44 which is applied as a bias, while varying the bias voltage of the triode 43 determines the current flow in the resistance 44 and, accordingly, the total voltage appearing thereacross.

Fire Control

Firing of thyratron 38 completes a circuit through secondary winding 37 of transformer 36, secondary winding 34 of transformer 31, secondary winding 35 of transformer 33, through line 40, and through rectifier unit 62, the latter providing a unidirectional return path for the current. Alternatively, when thyratron 41 fires, a current path is provided through the thyratron 41, up through the rectifier unit 63, and through the secondary windings 37, 34 and 35. The transformers 31 and 33 are properly poled, as has been explained hereinbefore, to apply firing pulses in alternation to the firing thyratrons 16 and 17. Accordingly, when the firing control thyratron 38 fires, a firing pulse is applied to the firing thyratron 16, which initiates firing of the ignition 3, the latter then continuing to pass current for the remainder of the positive half cycle applied to the anode 10 thereof. Similarly, when the firing control thyratron 41 fires, a properly poled firing pulse is applied to the transformer 33, which, in turn, initiates firing of the firing thyratron 17, and causes ignition of the ignitron 4, the latter then continuing to pass current for the remainder of the half cycle of positive voltage applied to the anode 11 thereof. At the time that a positive firing pulse is applied to the thyratron 16, a negative firing pulse is applied to the thyratron 17, which has no effect thereon. Similarly, at the time a positive firing pulse is applied to the thyratron 17 by the transformer 33 a negative pulse is applied to the thyratron 16, which has no effect thereon.

The ignitrons 3 and 4 are accordingly caused to fire in alternation, in synchronism with the alternating current supplied by the lines 1 and 2, at times determined by the setting of the variable tap of resistance 44, and by the bias applied to the control electrode of the triode 43.

The bias applied to the triode 43 on the other hand, is determined initially by the setting of the tap 55 along the resistance 54. The bias voltage further appears across series connected resistances 64 and 65, the junction point of which is connected to a terminal 66, which may be connected back to the control electrode of triode 43 by proper positioning of the switch arm 67. In the latter event, a perdetermined portion of the bias voltage available at the tap 55 may be applied to the control electrode of the triode 43, in accordance with the relative value of the resistors 64 and 65, which, for this purpose, provide a voltage divider.

The total bias voltage is applied to the control electrode of the triode 43 via normally closed contacts 68, across a storage condenser 69, in parallel with which is provided a discharge resistance 70 of variable magnitude determined by the setting of a variable tap 71.

Upon opening of the contacts 68, which occurs in response to energization of the relay 72, normally de-energized, the bias voltage available at the tap 5 is disconnected from the control electrode of the triode 43, but an identical voltage remains available due to the charge accumulated across the condenser 69. However, immediately following opening of the contacts 68 the condenser 69 commences to discharge over the resistance 70, and specifically over that portion of the resistance 70 which subsists between the terminal of the condenser 69 and the variable tap 71, and the bias applied to the triode 43 decays at a predetermined rate, becoming less and less negative as time passes. The current flowing in the triode 43 correspondingly increases as a time function, and the voltage across the tapped portion of the resistance 44 similarly increases as a function of time, the voltage applied to the control electrode of thyratrons 38 and 41 increasing positively with respect to the cathodes thereof. As the bias on the thyratrons 38 and 41 increases positively, the times of firing of the thyratrons is advanced slightly for each cycle of thyratron plate current, and the firing impulses so generated, being applied to the primary windings 34, 35 of transformers 31 to 33 are correspondingly advanced, resulting in increased average current flow in the ignitrons 3 and 4.

A. C. bias

While firing pulses for firing thyratrons 16 and 17 are derived from firing control thyratrons, at times determined by the bias schedule applied to the control grid of triode 43, these pulses serving to overcome the steady bias applied to firing control thyratrons via bias generating circuits 18 and 28, there is controllably applied still a further A. C. bias to the firing thyratrons 16 and 17, which is of such phase as to overcome the firing pulses, so that the firing of firing thyratrons 16 and 17 is prevented in the presence of the A. C. bias, and enabled in its absence.

The A. C. bias control circuit comprises one-half 80 of a secondary winding 81 of transformer 23, which is connected in series with primary windings 82 and 83 of transformers 84 and 85, having secondary windings 86, 87, respectively in the grid cathode circuits of firing thyratrons 16 and 17, in series with secondary windings 30 and 32, respectively. The circuits of primary windings 82 and 83, in series, is completed via one portion 88 of resistor 89, via variable tap 90, and back to the secondary winding 81.

Connected in series with the entire secondary winding 81 of transformer 23 is the entire resistor 89, and the back-to-back or inverse-parallel connected thyratrons 91 and 92. When the latter conduct they may be assumed to constitute a short circuit. The primary windings 82 and 83 are connected under this condition, between the mid-tap of secondary winding 81 and the variable tap 90. If the latter be properly adjusted, centrally of resistor 89, the primary windings will form effectively the cross-arm of a bridge circuit, and have zero voltage thereacross, and consequently no voltage therein.

Accordingly, the flow of current in primary windings 82 and 83 may be initiated and terminated, respectively, by rendering thyratrons 91 and 92 nonconductive and conductive, respectively.

The thyratron 92 is normally maintained unfired by a D. C. bias generated by rectifying, in rectifier 93, and across resistor 93', an A. C. voltage derived from secondary winding 94 of transformer 22. This bias voltage is established in series with a pair of leads 95, 95' and across a resistance 95a, which is shunted by thyratron 96. This bias is counteracted during the weld time by current flow through thyratron 112 and resistor 95a. The thyratron 92 remains fired until resistance 95a is shorted by thyratron 96, when the latter fires, which drops the potential of the grid of thyratron 92 at the anode of thyratron 96 and blocks thyratron 92.

When thyratron 92 fires it serves to fire thyratron 91. The latter is normally cut-off by bias voltage developed therein by grid rectification of current supplied by secondary winding 97 of transformer 22, and which may be assumed to subsist in storage condensers 98 and 99. A slow leakage path for condenser 99 is provided by parallel resistor 89, tap 90 and rectifier 101. Condenser 99 normally maintains its charge sufficiently to keep thyratron 91 cut-off condenser 98 discharging relatively rapidly, on alternate half cycles. When thyratron 92 conducts for one half cycle, however, a path for charging of condenser 98 via rectifier 101 is provided, through thyratron 92, which serves to charge condenser 98 with its cathode connected terminal negative, and to sufficient voltage to overcome the oppositely directed voltage subsisting in condenser 99.

Thyratrons 91 and 92 fire in pairs, then, if at all, under control of thyratron 96, and while they fire serve to enable flow of welding current or to disable the A. C. off-bias for firing thyratrons 16 and 17.

Control of spot duration, in the present system, is accomplished, then, by control of thyratron 96, and this control is initiated simultaneously with control of welding current rise by triode 43, in response to energization of relay 1TD, which takes place in accordance with a welding sequence which is in many respects conventional, and which will be explained in detail hereinafter. Suffice it to state at this point in the explanation that energization of 1TD closes relay contacts 102 and 103, and opens relay contacts 104. Closure of contacts 103 energizes relay 72 and initiates discharge of condenser 69, which in turn initiates a rise of current at the commencement of a spot weld. It is necessary simultaneously to remove negative bias from thyratron 92, over leads 95, 95'. This is accomplished as follows:

Thyratron 96 is normally maintained nonconductive by bias voltage developed across condenser 105 by rectification of current derived from secondary winding 106 of transformer 107, rectification taking place between anode 108 and cathode 109 of double diode 110. This bias is maintained so long as contacts 104 remain closed, and so long as contacts 111 of relay 4 CR remain closed.

Thyratron 112 is supplied with anode voltage from secondary winding 113 of transformer 107, its cathode being connected via series connected resistors 114, anode 115 of double diode 110, cathode 109, timing condenser 116, and back to secondary winding 113.

Thyratron 112 is normally maintained unfired by a voltage derived from secondary winding 107' of transformer 107, which is applied to primary winding 117 of a transformer 118, having a split secondary winding composed of sections 119 and 120. The section 119 is connected between cathode and control electrode of thyratron 112 via a phase shifting condenser 121, which serves normally to apply to the control electrode a voltage 180° out of phase with that applied to the anode of thyratron 112, and thus to maintain the latter unfired.

Upon closure of contacts 102 at the commencement of weld time, the phase shifting condenser 121 is by-passed via contacts 102, and an in-phase voltage is applied to the control electrode of thyratron 112. The latter now passes half cycles of current, which serve to charge the timing condenser 116 by successive increments of charge. Each increment of charge has a magnitude determined by the value of resistance in series with timing condenser 116, and consisting primarily of resistors 114, as many of which may be shorted out by switches 122 as may be desired, or as required to establish any predetermined weld time, elimination of each resistance 114 preferably reducing welding time by one cycle of welding current.

The voltage across timing condenser 116 is positive, as seen from control electrode 123 of thyratron 96, and in series with the negative voltage of bias condenser 105, and when timing condenser 116 has acquired sufficient charge the negative bias supplied by condenser 105 is overcome and thyratron 96 fires, terminating a spot and initiating hold time.

*Variety of rise curves of weld current*

One objective of the present invention, that of controlling the rise of current in a spot weld, is accordingly accomplished by the scheduling tube 43. By suitable selection of operating voltages for the tube, and of the setting of the variable tap of resistor 44, and the variable tap 71, the rise of current during each spot weld may be caused to follow any desired law of operation, including slow rise, abrupt rise, and the like, and the final value of the weld current similarly controlled.

Figure 2:
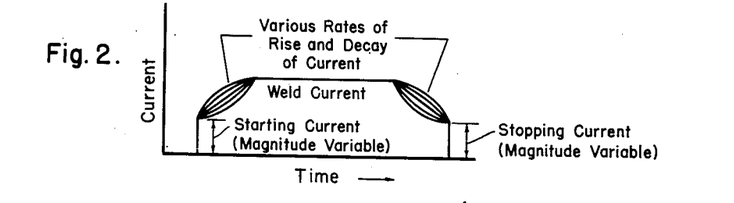
Figure 2 is a plot of currents in a weld against time, provided to illustrate the wide variety rates of use and decay available in the present system.
Figure 3:
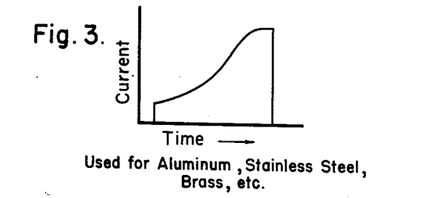
Figures 3, 4, 5 and 6 illustrate various specific weld current wave shapes, attainable by means of the present system, the legends attached thereto indicating the particular utility of the wave shape.
Figure 4:
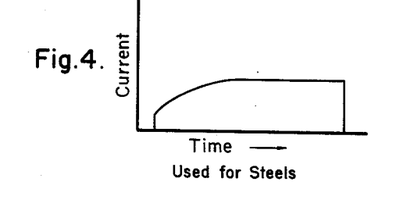
Figure 5:
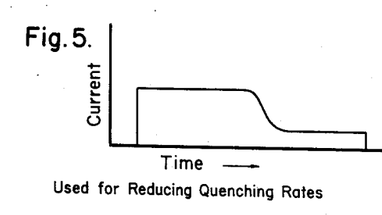
Figure 6:
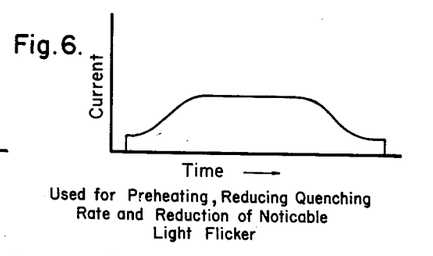

Reference is made to Figure 2, which shows a variety of weld current rise curves, available by virtue of the present invention. Figures 3, 4, 5 and 6 illustrate types of current rise which are particularly suitable for various purposes, or uses, as indicated on the legends adjacent the figures.

*Weld current decay*

Total weld time is also controllable, as is true in conventional systems. The system also includes, however, circuits for controlling the time in each weld when weld current shall commence to decay, and the rate of such decay.

To this end, a first control circuit is provided which determines when, during each weld, decay of weld current shall commence, and a further circuit, responsive to the first circuit, for controlling the rate of decay of weld current.

The circuit which controls the time at which weld current shall commence to decay includes an energizing transformer 200 having a center-tapped secondary winding 201, one end of which is connected through a relay coil 202 to the anode of a thyratron 203. The cathode of the thyratron 203 is connected directly to the center tap of the secondary winding 201. The remaining end of the transformer secondary winding 201 is connected to a control electrode of the thyratron 203 through the normally closed contacts 204, of relay 1TD. Connected in series with the control electrode referred to is a condenser 205 shunted by a resistor 206 which, together, form a timing circuit for the thyratron 203. While the contacts 204 are closed the condenser 205 charges by grid conduction in the thyratron 203, and the oppositely phased voltages on the control electrode and anode of thyratron 203 maintain the thyratron normally unfired. Upon opening the contacts 204, on the other hand, the control electrode of the thyratron 203 is supplied with alternating voltage taken from a potentiometer or voltage divider comprising three resistances 207, 208 and 209 connected in series across the upper half of the secondary winding 201, so that the control electrode becomes positive while positive potential is being applied to the anode of the thyratron 203. In this mode of operation, the only voltage which prevents firing of the thyratron 203 is the bias extending across the condenser 205. The latter voltage, however, decreases as time proceeds, since the condenser 205 discharges through the resistor 206. A point is ultimately reached at which the steady bias on the condenser 205 is insufficient to prevent firing of the thyratron when the grid and anode are simultaneously subjected to a positive cycle of voltage by the transformer secondary winding 201. At this time, the thyratron fires, and in firing energizes the relay 202.

The time delay between closure of the contacts 204 and energization of the relay 202 is then determined by the peak value of the alternating voltage applied to the control electrode of the thyratron 203 which is, in turn, determined by the setting of the variable contact 210 on the voltage divider comprising the resistors 207, 208 and 209, and by the value of the resistor 205, which is connected in shunt to the condenser 205 and which determines the discharge time thereof. A firing time for the thyratron 203 may, accordingly, be established, and hence an energization time for the relay 202, which corresponds with the precise instant at which it is desired that welding current commence to decrease, if relay contacts 204 are closed in response to welding current initiation.

Energization of the relay 202 results in initiation of a scheduled decrease in welding current, produced by a circuit now to be described. Alternating current voltage, derived ultimately from the lines 1, 2, is applied to the primary winding 211 of a transformer 212 having a secondary winding 213. The secondary winding 213 is connected in a conventional full wave rectifier circuit utilizing the double diode vacuum tube 214. The cathode of the double diode 214 is connected to one end, 215, of a pair of series connected resistors 216, 217, which are joined at the point 218, the remaining terminal of the resistor 217, identified as 219, being connected to a center tap 220 of the secondary winding 213. Accordingly, the point 215 is normally at a positive potential, the point 219 at a relatively negative potential, and the point 218 at an intermediate potential. The condenser 221 is connected between points 215 and 219 for filtering purposes.

The point 215 is connected in series with a resistance 221a to the anode 222 of a triode 223, the cathode 224 of which is connected to the point 218. The control electrode 225 of the triode 223 is connected by normally closed contacts 226 of relay 202 and via a protective resistance 227, to the terminal 219. Accordingly, the control electrode 225 is normally biased negatively, and this negative bias may be arranged to be sufficiently great to maintain the triode 223 cut-off as long as the contacts 226 remain closed, or, alternatively, at some fixed value.

Connected between the control electrode 225 and the cathode 224 is a condenser 228, which is shunted by an adjustable resistor 229 connected in series with the normally open contacts 230 of the relay 202. The condenser 228 then, so long as the contact 230 remains open, maintains a voltage equal to the voltage across the resistance 217, no current flow existing in the resistance 229 at this time due to the open contacts 230. The triode 223 being cut off, no difference of potential exists between the anode 222 and any point on the resistance 221a. A pair of leads 231 and 232 are connected respectively to the anode 222 and to an adjustable point on the resistance 221a.

Since the triode 223 is normally cut off, or at some fixed plate current, during build up time of welding current under control of the triode 43, and is, further, non-conductive or at that same fixed plate current during the steady condition of welding current, no voltage or a fixed voltage, exists across leads 231 and 232, and the triode 223 accordingly produces no variations in welding current After the relay 202 has been energized, however, the contacts 226 open, removing that bias voltage from the grid 225 which is due to the voltage developed across resistance 217, while maintaining that same bias voltage insofar as it exists across condenser 228. Simultaneously with opening of contacts 226 the contacts 230 close providing a discharge path for the condenser 228. Accordingly, the voltage on the condenser 228 commences to decrease and current flow in tube 223 accordingly commences to increase, causing a corresponding gradual increase of voltage between leads 232 and 231. Since the lead 231 is connected to the control electrodes of the thyratons 38 and 41, the lead 232 being connected to the cathodes thereof, the net effect is a gradual retardation of the firing times of the thyratrons 38 and 41, and a consequent gradual decrease in welding current. This decrease may be caused to subsist until the welding current is terminated and may be caused to have various laws of variation in accordance with different voltages which may be applied to the electrodes of triode 223, in accordance with the nature of the plate current characteristic of the triode 223, and in accordance with the rate of decay of the voltage across the condenser 228, as determined by the value of the resistance 229, as well as by the point on the resistance 221a to which lead 232 is tapped.

*Modified system—current rise*

Figure 7:
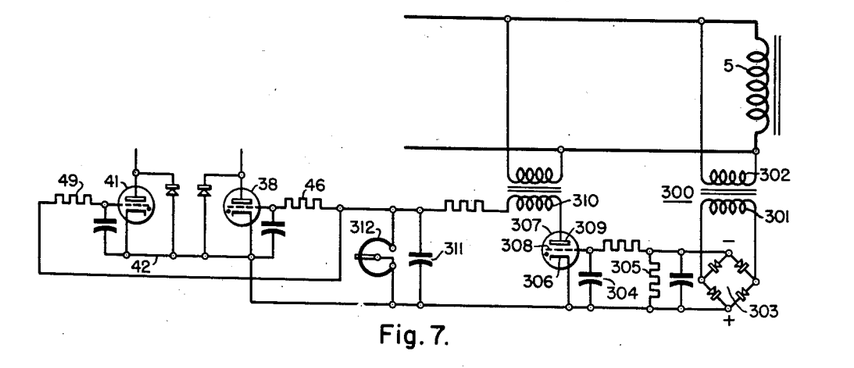
Figure 7 is a fragmentary schematic circuit diagram, illustrating a variation of the system of Figure 1.

A modification of the system of Figure 1 is illustrated in Figure 7. The circuit disclosed in Figure 7 of the drawings may be utilized in place of the triode 43, and its associated bias control circuits, falling within the block X, (Fig. 1) for establishing a variable D. C. bias for control thyratrons 38 and 41, leaving the remainder of the system of Figure 1 substantially unchanged.

Briefly described, the system of Figure 7 involves initiation of weld current scheduling in response to initiation of weld current, rather than in response to opening of contacts 68 by energization of relay 72 when the squeeze time thyratron 259 fires. This result is certain simplifications of the system. In the system of Figure 7, a timing condenser which is shunted by a discharge resistance of variable size is normally maintained in charged condition, charging being accomplished over a thyratron which is normally maintained biased to a value such that it fires when plate current is applied thereto. The voltage across the condenser is utilized to establish a D. C. bias for a pair of firing control thyratrons which, in the embodiment of Figure 1 of the drawings, correspond with thyratrons 38 and 41. Circuits are provided for developing an off-bias for the thyratron which is in circuit with the biasing condenser in response to welding current. Accordingly, as soon as welding current commences to flow, charging of the condenser ceases, and the condenser proceeds to discharge through its shunt resistance. As the condenser discharges, the voltage across the condenser decreases and since the voltage across the condenser represents a bias on the fire control thyratrons, the latter fire earlier and earlier in the A. C. cycle and the welding current gradually increases. When the condenser has fully discharged, the firing control thyratons have applied thereto a bias suitable for normal welding.

Proceeding now with a more detailed description of the system of Figure 7 the transformer 300 is coupled or connected to the welding transformer primary winding 5 in any convenient manner, and specifically may be connected thereacross. The secondary winding 301 of the transformer 300 is connected across a rectox unit 303 which develops a D. C. bias across a condenser 304 shunted by a resistance 305. The condenser 304 serves to filter the rectified voltage. The positive plate of condenser 304 is connected to the cathode 306 of a thyratron 307, while the control electrode 308 of the thyratron 307 is connected to the negative plate of the condenser 304. In the absence of welding voltage applied to the transformer 302 the bias of the tube 307 is zero, and the tube is accordingly subject to being fired in response to positive anode voltage applied thereto. In the presence of welding voltage at the transformer 300, on the other hand, the negative bias developed across the condenser 304 and resistance 305 is sufficient to cut off the thyraton 307 and to prevent its firing in response to positive anode voltage applied thereto.

A. C. anode voltage for the thyratron 307 is supplied over a transformer 310, the secondary winding of which is connected in series with the anode 309 of the thyratron 307, and with a condenser 311 which is shunted by a variable discharge resistor 312. The positive plate of the condenser 311 is connected back to the cathode 306 of the thyratron 307. Accordingly, so long as the thyratron 307 is conductive, the condenser 311 is maintained charged. When the thyratron 307 is rendered non-conductive in response to appearance of welding current in the system the charging circuit for the condenser 311 is broken, and the condenser commences to discharge through its shunt resistance 312.

The cathodes of the firing control thyratrons 38 and 41 are connected to the positive terminal of the condenser 311, the negative terminal of the latter being connected to the junction point of resistances 46 and 49. Accordingly, prior to initiation of welding current maximum negative bias is applied to the firing control thyratrons 38 and 41, and these thyratrons accordingly fire late in the cycle of anode voltage applied thereto. As the charge on the condenser 311 leaks off and its voltage correspondingly decreases, the bias on the thyratrons 38 and 41 correspondingly decrease, the firing time is gradually advanced increasing the welding current.

Sequencing

The present system utilizes a sequencing system which is, in general, of conventional character, but which possesses certain novel features. The welding sequencer, will, accordingly, be briefly described herein, the novel features being more particularly pointed out.

Welding is initiated by pressing a foot switch 250 to close the contacts associated therewith. Upon closing the switch 250 the relay 5CR is energized over the upper half 251 of the secondary winding of a transformer 252, the primary winding 253 of which may be connected directly across a secondary winding of transformer 23.

Energization of relay 5CR effects opening of contact 254 and closure of contacts 255, 256, 257, and 258. The squeeze time thyratron 259 is normally maintained unfired, since its control electrode and anode are energized in opposite phase. The cathode of thyratron 259 is connected to a line 260, which is connected to the center tap of secondary winding 251. Its anode is connected to one side of the secondary winding 251, and its control electrode is connected to the other side of the secondary winding 251 via the normally closed contact 254. While the thyratron is maintained in unfired condition a timing condenser 261 in the control electrode circuit thereof is charged by grid conduction. When the contacts 254 open, however, A. C. voltage is applied to the control electrode of the thyratron 259 across a potentiometer 262, and this voltage being in phase with the anode voltage applied to the thyratron 259, the latter tends to fire, firing being prevented, however, by the bias established on the condenser 261. The voltage on the condenser 261, due to the charge thereon, gradually decreases with time, since the condenser 261 is shunted by a resistor 263. Accordingly, after a predetermined time, the thyratron 259 fires, signaling the end of squeeze time.

Closure of the contacts 255, in response to closure of switch 250, completes a circuit for an electro-magnet 264, directly across the lines 1—2. Energization of the electromagnet 264 opens the valve 265, which applies pressure to the pressure switch 266, normally hydraulically. The latter then serves to control the forge 267, which applied pressure to the electrodes 8, serving to compress the work 9 during the squeeze period.

Additionally, actuation of pressure switch 266 serves to close contacts 268, which prepares a circuit through now closed contacts 258 for the time delay relay 1TD, which is connected in the anode circuit of the squeeze thyratron 259. The relay 1TD will, accordingly, be energized as soon as the thyratron 259 fires, provided pressure switch 266 has operated.

Closure of contacts 256, in response to closure of switch 250, completes a circuit through an electro-magnet 270 via normally closed contacts 271, the electro-magnet 270 being energized directly across the lines 1—2 and serving to impart extra pressure to the work 9, so long as the contacts 271 remain closed.

Upon firing of the thyratron 259, which signifies termination of squeeze time, the relay ITD is energized. Energization of relay ITD serves to close the normally open contacts 102 and 103, and to open the normally closed contacts 104. The function of these contacts has been explained hereinbefore, and briefly described involve initiation of a spot weld, including initiation of the spot current build up schedule, the total spot duration timer, and the timer comprising the thyratron 203, which controls initiation of decay of welding current. Termination of a spot weld is signaled, as has been explained hereinbefore, by energization of the relay 4CR, in response to firing of the thyratron 96.

Connected in series with thyratron 259 across the upper half 251 of the secondary of the transformer 252 is a relay coil 272 connected in series with a double diode 273, the cathode of which is connected directly to the anode of the thyratron 259. When the thyratron 259 fires, accordingly, a circuit is completed through the relay 272 and the double diode 273, and the relay 272 is energized, opening the contacts 274. Accordingly, the contacts 274 open upon initiation of a weld.

Opening of the contacts 274 initiates a timing cycle of the forge time thyratron 275, which operates in a manner entirely similar to the thyratron 253. The specific mode of operation of forge time thyratron 275 need not, accordingly, be detailed herein, further than to state that the thyratron 275 is maintained in unfired condition by voltage developed on a condenser 276, which is charged by grid conduction while the thyratron is unfired. The charge on the condenser 276 discharges through an appropriate resistance 277 connected in parallel with the condenser 276, after contacts 274 are opened, until the bias on the thyratron 275 is sufficiently reduced to enable firing thereof.

The forge switch 278 is connected in series with a relay II CR and with the thyratron 275. Accordingly, if forge switch 278 is closed, relay II CR becomes energized when thyratron 275 fires. Energization of relay coil II CR opens the contacts 271 and breaks the circuit for the electro-magnet 270, which reduces pressure of the electrodes 8 upon the work 9. This reduction of pressure, however, occurs at a predetermined time during flow of welding current, so that during the initial portion of the welding cycle a greater pressure may be applied to the work than is applied during the remainder of the cycle. It is well known that heat developed in a weld is inversely proportional to the pressure applied to the material being welded. Accordingly, the additional pressure applied during the early part of the weld serves to reduce the heat generated and hence, assists in providing a true pre-heat period during each spot weld. The added pressure further assists in dissolution of scale or surface oxides prior to application of weld current, as has been explained hereinabove.

If it is desired that no extra forge pressure be available, in the pre-heat period, the forge switch 278 may be opened, in which case, the thyratron 275 and its relay II CR are effectively eliminated from the system.

Energization of relay 4 CR in response to firing of thyratron 96 results in opening of contacts 280, which initiates hold time, at the end of which the thyratron 281 fires. Firing of thyratron 281 then initiates a further welding cycle, if the system is set for repeat operation, or initiates timing of the off timing thyratron 282 if only a single weld is desired.

While we have described the present system as applied in a particular welding system it will be realized that its application is broad and extensive, in the welding art, and in the art of scheduling current flow between a load and a source of alternating current power.

We claim as our invention:

1. In a system for reducing spitting during spot welding of oxide coated metal, wherein said spot welding requires predetermined welding current and predetermined forge pressure to effect welding, the combination comprising, means for passing an initial pre-heating current less than said predetermined welding current through said metal, means for applying greater than said predetermined forge pressure to said metal during flow of said pre-heating current, and means for increasing said pre-heating current to said predetermined welding current and for reducing said greater than said predetermined forge pressure to said predetermined forge pressure during a spot weld period following said flow of said pre-heating current.

2. In a system for scheduling increase of current during a spot weld, the combination comprising a pair of ignitrons connected back-to-back, a power line connected in series with said ignitrons, a welding transformer connected in said line, a pair of firing control tubes for said ignitrons, each of said firing control tubes comprising a cathode, an anode, and a control electrode, means for applying first alternating voltages to said anodes in first predetermined phases, means for applying second alternating voltages to said control electrodes in second predetermined phases, displaced from said first predetermined phases, means for generating and applying to said control electrodes a time varying direct current bias superposed on said second alternating voltages to vary firing times of said firing control tubes, said means for generating said time varying direct current bias comprising a vacuum tube having a cathode, an anode, and a grid, an anode resistor in series with said anode of said vacuum tube, a bias circuit for applying negative bias to said grid, said bias circuit comprising a condenser and a discharge resistance shunting said condenser, a charging circuit for normally maintaining a predetermined charge in said condenser, and means responsive to initiation of a weld for disconnecting said charging circuit from said condenser.

3. In a system for scheduling variation of welding current during a spot weld, a pair of firing control thyratrons, each having an anode, a cathode and a control electrode, means for applying first voltages of opposite phase to said anodes, respectively means for applying second voltages of opposite phase to said control electrodes, respectively, means for phase displacing said second voltages with respect to said first voltages, a source of variable D. C. bias for said control electrodes in series with said second electrodes, means comprising a condenser for establishing said variable D. C. bias, a source of charging current normally maintaining said condenser charged, a discharge resistance for said condenser, and means responsive to initiation of a spot weld for disconnecting said source of charging current from said condenser.

4. The combination in accordance with claim 3 wherein said means for disconnecting said source of charging current from said condenser comprises a gaseous tube connected in series with said condenser and said source of charging current, and means responsive to welding current for off-biasing said gaseous tube.

5. In an electric current control system, a gaseous conduction device having a cathode and a control electrode, a controlled D. C. bias circuit for said gaseous conduction device, said bias circuit comprising a condenser shunted by a discharge resistance, means for connecting said condenser between said cathode and said control electrode, a charging circuit for said condenser comprising a source of alternating current and a thyratron connected in series with said condenser, means normally maintaining said thyratron at firing bias, a source of control voltage, and means responsive to said control voltage for developing cut-off bias for said thyratron.

6. In a control system, a gaseous conduction device for controlling flow of electric current in response to control of firing times of said gaseous conduction device, said gaseous conduction device having an anode, a cathode, and a control electrode, means for applying mutually phase displaced alternating voltages to said anode and to said control electrode, means for applying a variable D. C. bias to said control electrode to vary firing times of said gaseous conduction device in response to said alternating voltages, said last means comprising a condenser, a series circuit comprising said source of alternating voltage and a rectifier in series with said condenser, a discharge resistance shunting said condenser, and means for breaking said series circuit.

7. The combination in accordance with claim 6 wherein said means for breaking said series circuit comprises means for blocking said rectifier.

8. In a control circuit for controlling flow of current between a work circuit and a source of periodic current, a gaseous conduction device having an anode, a cathode and a control electrode, means for energizing said anode, cathode and control electrode from said source of periodic current to effect periodic transfer of current from said source of periodic current to said work circuit, means comprising a direct current bias source for controlling the duration of each of said periodic transfers of current, said direct current bias source comprising a vacuum tube having an anode, a cathode and a control electrode, a source of direct current voltage, a pair of voltage dividing resistors connected in series across said source of direct current voltage to provide a positive and a negative terminal and a junction, means connecting said last named anode in series with a load resistor to said positive terminal, means connecting said last named cathode to said junction, a pair of normally closed contacts, a two terminal condenser, means connecting said pair of normally closed contacts and said condenser in series between said negative terminal and said cathode with one terminal of said condenser connected directly to said cathode, a direct current connection between said control electrode and the remaining terminal of said condenser, means for deriving said bias from said load resistor, and means for opening said normally closed contacts.

9. In a control circuit for controlling flow of current between a work circuit and a source of periodic current, a gaseous conduction device having an anode, a cathode and a control electrode, means for applying between said anode and cathode a first voltage of first predetermined phase deriving from said source, means for applying between said control electrode and said cathode a further periodic voltage of phase opposite to said first predetermined phase for preventing firing of said gaseous conduction device, means for applying between said cathode and said control electrode a still further periodic firing voltage of phase intermediate said first mentioned phases, means for varying the phase of said still a further periodic firing voltage in accordance with a predetermined law of variation of phase with time, and means for selectively controlling application of said further periodic voltage between said cathode and said control electrode.

10. Apparatus for spot welding metal which requires a predetermined welding current and a predetermined welding electrode pressure to effect welding, the combination comprising means for passing a current less than said predetermined welding current through said metal for a predetermined period of time, means for applying an electrode pressure greater than said predetermined pressure during said period while said current less than said welding current is flowing, means for passing full welding current through said metal for a predetermined period, and means for applying said predetermined welding electrode pressure while said welding current is flowing.

11. In combination, a plurality of electric valves each having an anode, a cathode and a control electrode, terminals for connection to an alternating voltage source, connections between the anodes and cathodes of said valves and said first terminals, means for applying a direct current bias to said valves, said means comprising a vacuum tube for supplying said bias, a time constant circuit for biasing said tube to non-conductivity and means adapted to initiate discharge of said time constant circuit when current begins to flow in said plurality of valves.

12. In combination, a plurality of electric valves each having an anode, a cathode and a control electrode, first terminals for connection to an alternating voltage source, connections between the anodes and cathodes of said valves and said first terminals, second terminals for connection to a second source of alternating voltage, means connecting said second terminals between the control electrodes and cathodes of said valves, means for applying a direct current bias to said valves, said means comprising a time constant circuit, and means responsive to the discharge of said time constant circuit to vary said bias in dependence on a condition of said time constant circuit.

13. In combination, a plurality of electric valves each having an anode, a cathode and a control electrode, terminals for connection to an alternating voltage source, connections between the anodes and cathodes of said valves and said first terminals, means for applying a direct current bias to said valves, said means comprising a time constant circuit comprising a capacitor and a resistor connected to discharge said capacitor, and means responsive to the discharge of said time constant circuit to vary said bias in dependence on the charge on said capacitor.

14. In combination, a plurality of electric valves each having an anode, a cathode and a control electrode, first terminals for connection to an alternating voltage source, connections between the anodes and cathodes of said valves and said first terminals, second terminals for connection to a second source of alternating voltage, means connecting said control electrodes and said cathodes of said valves to said second terminals, a capacitor means connected between the control electrodes and the cathodes of each of said valves, resistance means for discharging said capacitor means, a time constant circuit, and means for charging said capacitor means in dependence on the condition of said time constant circuit.

15. In combination, a plurality of electric valves each having an anode, a cathode and a control electrode, first terminals for connection to an alternating voltage source, connections between the anodes and cathodes of said valves and said first terminals, second terminals for connection to a second source of alternating voltage, means connecting said control electrodes and said cathodes of said valves to said second terminals, a capacitor means connected between the control electrodes and the cathodes of each of said valves, resistance means for discharging said capacitor means, a time constant circuit, means for initiating the timing of said time constant circuit at the instant when said valves first become conductive, and means for charging said capacitor means in dependence on the condition of said time constant circuit.

CLARENCE B. STADUM.
WILLIAM E. LARGE.

REFERENCES CITED

The following references are of record in the file of this patent:

UNITED STATES PATENTS

| Number | Name | Date |
| --- | --- | --- |
| 2,083,190 | Dawson | June 8, 1937 |
| 2,147,468 | Stoddard | Feb. 14, 1939 |
| 2,210,710 | Diamond et al. | Aug. 6, 1940 |
| 2,224,733 | Konig et al. | Dec. 10, 1940 |
| 2,243,833 | Bohn | June 3, 1941 |
| 2,314,691 | Dawson et al. | Mar. 23, 1943 |
| 2,315,916 | Whiteley et al. | Apr. 6, 1943 |
| 2,411,708 | Bivens | Nov. 26, 1946 |